(12) United States Patent
Taber et al.

(10) Patent No.: US 8,241,585 B2
(45) Date of Patent: Aug. 14, 2012

(54) REFRACTORY WALL AND METHOD FOR FABRICATING THE SAME

(75) Inventors: Wade Albert Taber, Katy, TX (US); Judeth Helen Brannon Corry, Manvel, TX (US)

(73) Assignee: General Electric Company, Schenectady, NY (US)

( * ) Notice: Subject to any disclaimer, the term of this patent is extended or adjusted under 35 U.S.C. 154(b) by 403 days.

(21) Appl. No.: 12/533,398

(22) Filed: Jul. 31, 2009

(65) Prior Publication Data
US 2011/0023399 A1    Feb. 3, 2011

(51) Int. Cl.
*B01J 19/00* (2006.01)
*G01K 1/00* (2006.01)

(52) U.S. Cl. ........ 422/241; 422/240; 422/119; 422/187; 110/336; 110/323; 374/141; 374/143; 374/194; 374/208

(58) Field of Classification Search .......... 422/119, 422/187, 240, 241; 110/336, 323; 374/141, 374/143, 194, 208
See application file for complete search history.

(56) References Cited

U.S. PATENT DOCUMENTS

| | | | |
|---|---|---|---|
| 4,776,705 | A | 10/1988 | Najjar et al. |
| 5,005,986 | A | 4/1991 | Najjar et al. |
| 5,372,618 | A | 12/1994 | Andrus, Jr. |
| 6,053,632 | A | 4/2000 | Leininger |
| 6,827,485 | B2 | 12/2004 | Isebrand |
| 2003/0174756 | A1* | 9/2003 | Groen ........................ 374/141 |

* cited by examiner

*Primary Examiner* — Walter D Griffin
*Assistant Examiner* — Lessanework Seifu
(74) *Attorney, Agent, or Firm* — Armstrong Teasdale LLP (57) ABSTRACT

A refractory wall is provided. The refractory wall includes a plurality of wall bricks coupled together to define an inner surface of the refractory wall, and a sensor port coupled to the plurality of wall bricks. The sensor port includes an outer wall defining a radial cross-sectional shape of the sensor port and defining a top ridge of the sensor port, an inner wall defining an opening extending through the sensor port, and an end wall extending between the outer wall and the inner wall. The end wall is positioned radially inward a distance from the inner surface. A method for fabricating the refractory wall is also provided.

17 Claims, 8 Drawing Sheets

REFRACTORY WALL AND METHOD FOR FABRICATING THE SAME

BACKGROUND OF THE INVENTION

The embodiments described herein relate generally to a refractory wall and, more particularly, a vessel including a refractory wall, wherein a quantity is being measured.

At least some known vessels, such as gasifiers, produce syngas, fly ash particulates, and slag. As the slag cools within the vessel, some suspended slag and/or particulates may deposit on a refractory wall of the vessel. For example, in an entrained flow gasifier, thick slag flows down the refractory wall of the gasifier. At least some known gasifiers include sensors coupled therein for measuring physical properties within the gasifier. Often, the sensors are coupled within openings defined in and extending through the refractory wall. However, openings in the wall that receive instruments, such as thermocouples, may become covered with a slag curtain such that the slag affects the gasifier instrument measurement and/or control. As such, in at least some known gasifiers, gasifier properties are inferred from those measurements taken behind a flowing curtain of slag and/or taken within the depths of the refractory wall.

At least one known gasifier uses slag drip points to protect instruments and/or metallurgical components. Such drip points are positioned to disrupt the slag flow at an opening in which an instrument is inserted to flow about the opening. However, eventually at the drip points, the slag may form a curtain between a tip of an instrument and the gases to be measured. As such, at least one other known gasifier includes a slag shield that extends through a gasifier wall and into a gasifier process stream. However, known slag shields are coupled to the gasifier wall via mechanical means, such as fasteners, flanges, and welding. Over time, such mechanical means can still be weakened, corroded, fatigued, and/or otherwise damaged by the materials produced within the gasifier.

As such, it is desirable to provide protection for an instrument positioned within a vessel refractory wall such that the instrument can directly measure physical properties within the vessel without interference from fouling, slag, and/or any other flowing layer. Moreover, it is desirable to provide protection for an instrument within a vessel such that the protection does not sustain substantially wear from materials produced within the vessel.

BRIEF DESCRIPTION OF THE INVENTION

In one aspect, a method of fabricating a vessel refractory wall is provided. The method includes coupling a plurality of wall bricks together to form a wall. The plurality of wall bricks defines an inner surface of the wall. At least one port brick is coupled to the plurality of wall bricks to form a sensor port having an opening that extends through the wall. An end wall of the sensor port is positioned a distance radially inward from the inner surface of the wall and the at least one port brick forms a top ridge for the sensor port.

In another aspect, a refractory wall is provided. The refractory wall includes a plurality of wall bricks coupled together to define an inner surface of the refractory wall, and a sensor port coupled to the plurality of wall bricks. The sensor port includes an outer wall defining a radial cross-sectional shape of the sensor port and defining a top ridge of the sensor port, an inner wall defining an opening extending through the sensor port, and an end wall extending between the outer wall and the inner wall. The end wall is positioned radially inward a distance from the inner surface.

In yet another aspect, a vessel is provided. The vessel includes a shell, a refractory wall coupled within said shell and defining an inner surface of the vessel, and a sensor port coupled to the refractory wall. The sensor port includes an outer wall defining a radial cross-sectional shape of the sensor port and defining a top ridge of the sensor port, an inner wall defining an opening extending through the sensor port, and an end wall extending between the outer wall and the inner wall. The end wall is positioned radially inward a distance from the inner surface.

The embodiments described herein provide a refractory wall with a sensor port coupled to the bricks forming the refractory wall. The sensor port extends radially inward from an inner surface of the refractory wall. The sensor port includes a top ridge that facilitates channeling a flow of material around, but not over, the sensor port. As such, a sensor within the sensor port is able to detect quantities of physical properties, such as temperature and pressure, of a vessel internal process stream such that process physical properties can be accurately and directly measured without any influence of the flowing material layer.

DETAILED DESCRIPTION OF THE INVENTION

The embodiments described herein provide a refractory wall that includes at least one integrated sensor port. In the exemplary embodiment, each sensor port extends radially inward from an inner surface of the refractory wall to enable a flow of material, such as slag, to be channeled around, but not over, the sensor port. As such, a sensor inserted within such a sensor port is able to detect quantities of physical properties, such as temperature and pressure, of a vessel internal process stream such that process physical properties can be accurately and directly measured without any influence of the slag layer. By acquiring more accurate measurements of physical properties within the vessel, as compared to vessels that do not include the sensor ports described herein, the embodiments described herein facilitate better monitoring and/or control of the vessel leading to improved control of syngas production and related plant operability.

At least one embodiment described herein includes a ridge that continues from a top of a sensor port to sides and a bottom of the sensor port. Further, at least some embodiments described herein include active cooling for a sensor port.

In the exemplary embodiment, the vessel is a gasifier; however, the embodiments described herein can be used with any vessel having a refractory wall. More specifically, the sensor ports described herein can be used with any process unit that uses a refractory lined process vessel that has slag, fouling, and/or any other flowing layer of material on a refractory wall thereof.

Figure 1:
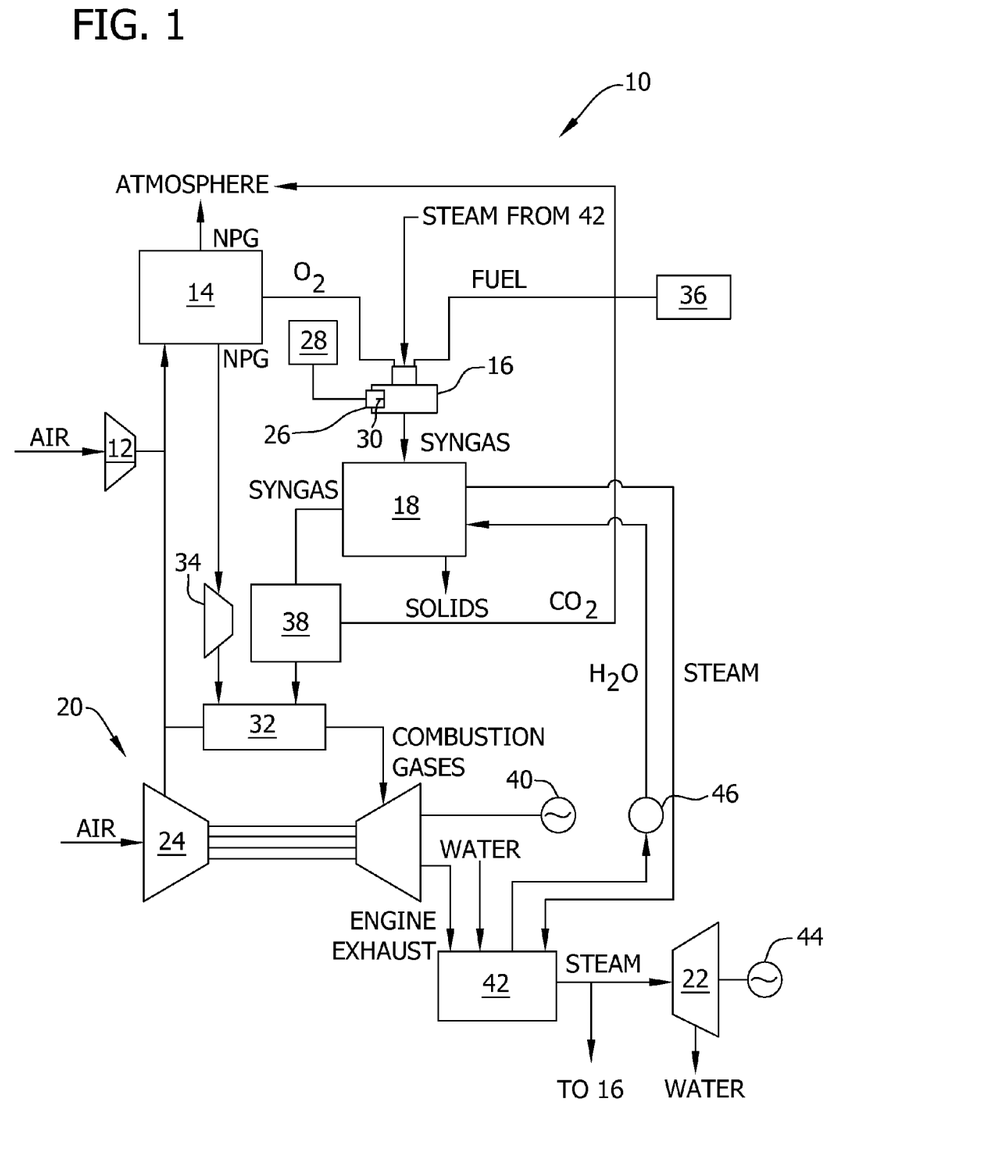
FIG. 1 is schematic view of an exemplary integrated gasification combined cycle system.

FIG. 1 is a schematic diagram of an exemplary integrated gasification combined-cycle (IGCC) power generation system 10. In the exemplary embodiment, IGCC system 10 includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication to syngas cooler 18, and a steam turbine 22 coupled in flow communication to syngas cooler 18.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen ($O_2$) and a gas by-product, sometimes referred to as a "process gas." The $O_2$ flow is channeled to gasifier 16 for use in generating partially combusted gases, referred to herein as "syngas" for use by gas turbine engine 20 as fuel, as described below in more detail.

Gasifier 16 includes, in the exemplary embodiment, a sensor system 26 coupled to a control and acquisition system 28, as described in more detail below. Sensor system 26 includes at least one instrument or sensor 30 that measures a quantity within gasifier 16, such as, but not limited to, a temperature sensor, a pressure sensor, a chemical sensor, a particulate probe, a particulate sensor, and/or any other suitable type of sensor configured to measure an internal gasifier composition, a pressure, a temperature, a heat flux, a velocity, acoustics, a vibration, a particulate composition, a particulate concentration, and/or other suitable gasifier characteristics. Control and acquisition system 28 receives measurements from sensor system 26 and monitors and/or controls at least one parameter within IGCC system 10 based on the received measurements. Further, although control and acquisition system 28 is shown as only being coupled to sensor system 26, it should be understood that control and acquisition system 28 may be coupled to any suitable component of IGCC system 10 for use in monitoring and/or controlling the component. As such, control and acquisition system 28 is configured to transmit and receive data, commands, and/or any other suitable electric signals.

Process gases generated by ASU 14 include nitrogen and will be referred to herein as "nitrogen process gas" (NPG). NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at least some of the NPG flow is injected into a combustion zone (not shown) defined within gas turbine engine combustor 32 to facilitate controlling emissions of engine 20, and more specifically to facilitate reducing the combustion temperature and nitrous oxide emissions generated within engine 20. In the exemplary embodiment, IGCC system 10 includes a compressor 34 for compressing the NPG flow before being injected into the combustion zone of gas turbine engine combustor 32. In particular embodiments, the NPG flow is channeled to sensor port 100, 200, 300, 400, and/or 500 (shown in FIGS. 2-8) for cooling sensor 30 positioned within sensor port 100, 200, 300, 400, and/or 500.

Gasifier 16 converts a mixture of fuel supplied from a fuel supply 36, $O_2$ supplied by ASU 14, steam, and/or fluxant into an output of syngas for use by gas turbine engine 20 as fuel and/or for use in downstream processes related to a refining process, a methanol process, an ammonia process, a coal-to-chemicals process, and/or any other suitable process. Although gasifier 16 may use any fuel, gasifier 16, in the exemplary embodiment, uses coal, petroleum coke, residual oil, oil emulsions, tar sands, and/or other similar high ash content fuels. Furthermore, in the exemplary embodiment, the syngas generated by gasifier 16 includes carbon dioxide.

In the exemplary embodiment, syngas generated by gasifier 16 is channeled to syngas cooler 18 to facilitate cooling the syngas, as described in more detail below. The cooled syngas is channeled from cooler 18 to a clean-up device 38 wherein the syngas is cleaned before being channeled to gas turbine engine combustor 32 for combustion thereof. Carbon dioxide ($CO_2$) may be separated from the syngas during clean-up, and in the exemplary embodiment, the $CO_2$ may be vented to the atmosphere and/or captured. In particular embodiments, at least a portion of a CO2 recycle gas flow is injected into a gasification zone through sensor port 100, 200, 300, 400, and/or 500. In the exemplary embodiment, gas turbine engine 20 drives a generator 40 that supplies electrical power to a power grid (not shown). Exhaust gases from gas turbine engine 20 are channeled to a heat recovery steam generator 42 that generates steam for driving steam turbine 22. Power generated by steam turbine 22 drives an electrical generator 44 that provides electrical power to the power grid. In the exemplary embodiment, steam from heat recovery steam generator 42 is supplied to gasifier 16 for use in generating syngas.

Furthermore, in the exemplary embodiment, system 10 also includes a pump 46 that supplies boiled water from steam generator 42 to syngas cooler 18 to facilitate cooling the syngas channeled from gasifier 16. The boiled water is channeled through syngas cooler 18 wherein the water is converted to steam. Steam from cooler 18 is then returned to steam generator 42 for use within gasifier 16, syngas cooler 18, and/or steam turbine 22.

Figure 2:
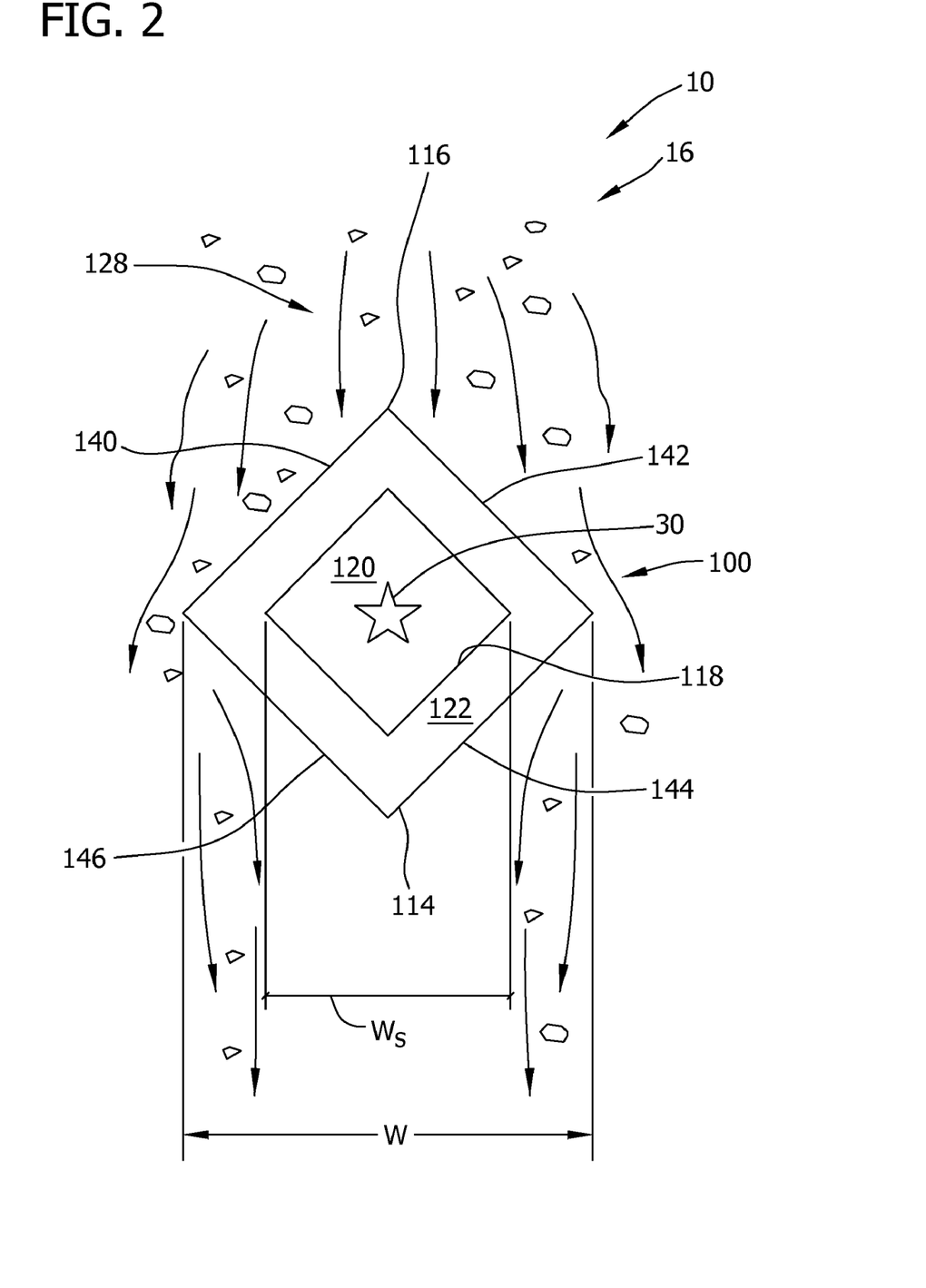
FIG. 2 is a schematic front view of an exemplary sensor port that may be used with the system shown in FIG. 1.
Figure 3:
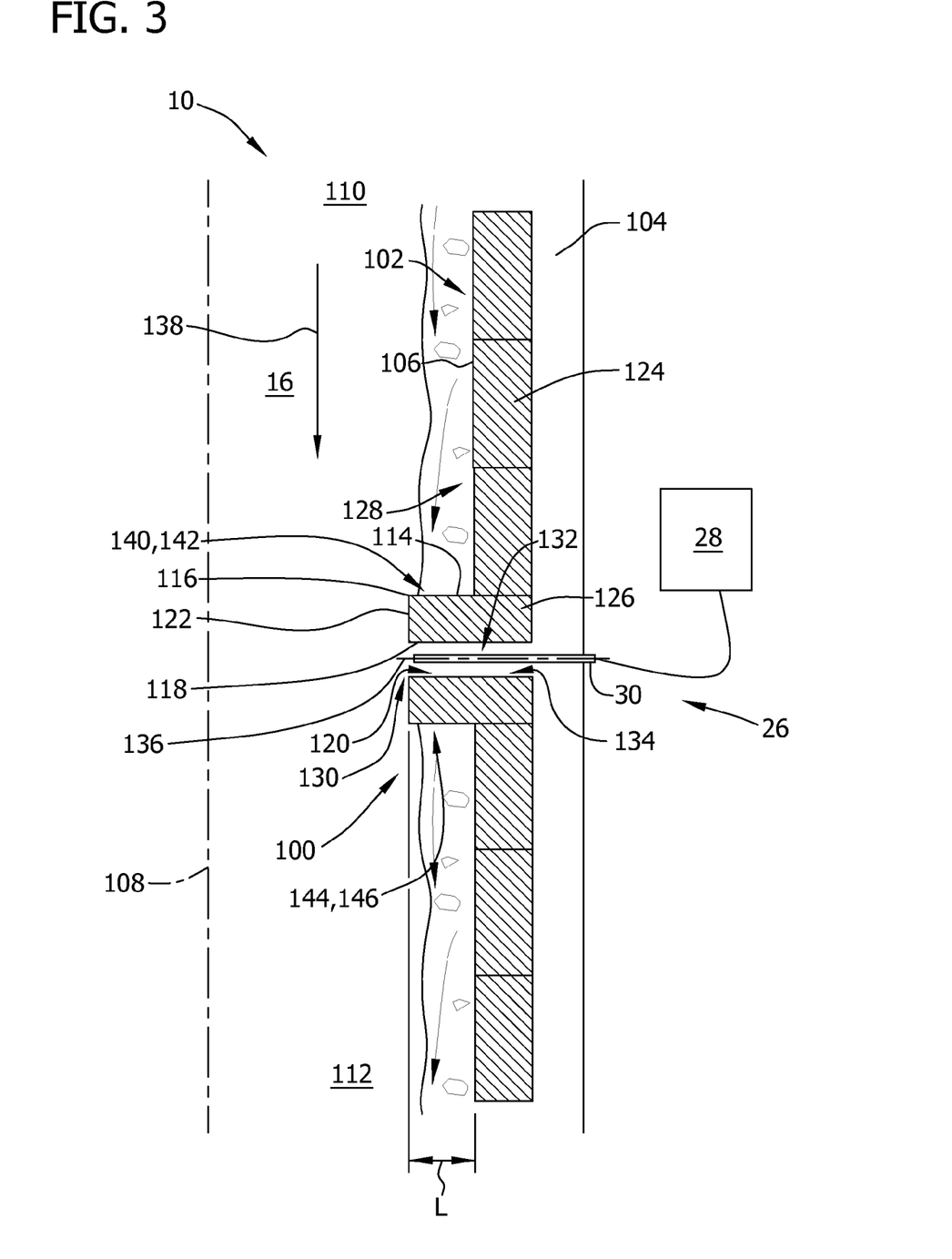
FIG. 3 is a partial cross-sectional side view of the sensor port shown in FIG. 2.

FIG. 2 is a schematic front view of an exemplary sensor port 100 that may be used with IGCC system 10 (shown in FIG. 1). FIG. 3 is a partial cross-sectional side view of sensor port 100. Gasifier 16 includes a wall 102 and a shell 104 enclosing wall 102. Wall 102 defines an inner surface 106 of gasifier 16. A longitudinal axis 108 of gasifier 16 extends through a center of shell 104 and from a top 110 of gasifier 16 to a bottom 112 of gasifier 16. As used herein, the terms "up," "upwardly," and/or variations thereof refer to a direction along longitudinal axis 108 from bottom 112 toward top 110 of gasifier 16. Further, as used herein, the terms "down," "downwardly," and/or variations thereof refer to a direction along longitudinal axis 108 from top 110 toward bottom 112 of gasifier 16. Moreover, as used herein, the term "radially inward" refers to a direction from shell 104 toward longitudinal axis 108, and the term "radially outward" refers to a direction from longitudinal axis 108 toward shell 104.

In the exemplary embodiment, sensor port 100 includes an outer wall 114 that defines a top ridge 116 of sensor port, an inner wall 118 that defines an opening 120 extending through sensor port 100, and an end wall 122 that extends between outer wall 114 and inner wall 118. End wall 122 extends a distance L radially inward from wall inner surface 106. Distance L also represents a length L of sensor port 100. Outer wall 114 defines an axial cross-sectional shape and a radial cross-sectional shape of sensor port 100. As used herein, an axial cross-sectional shape is a cross-section taken substantially parallel to longitudinal axis 108 of gasifier 16, and a radial cross-sectional shape is a cross-section taken substantially perpendicularly to longitudinal axis 108.

In the exemplary embodiment, sensor port 100 and wall 102 are both formed from refractory material, such as refractory bricks 124 and/or 126. As such, sensor port 100 is formed integrally as a part of wall 102, as described in more detail herein. Further, in the exemplary embodiment, sensor port 100 prevents slag 128 from flowing over and/or adjacent to sensor 30. More specifically, sensor port 100 includes top ridge 116 that divides a flow of slag 128 along wall 102 to substantially prevent slag 128 from interfering with sensor 30. Top ridge 116 defines the uppermost point of sensor port 100. Moreover, to facilitate dividing slag flow 128, sensor port 100 has a width W that increases from top ridge 116 downwardly to form a width Ws of sensor port 100 at sensor 30. Although width Ws is illustrated as the largest width W of sensor port 100, width Ws may or may not define the largest width W of sensor port 100. Additionally, in the exemplary embodiment, sensor port 100 has length L that enables outer wall 114 and/or end wall 122 of sensor port 100 to extend past slag flow 128. Length L is selected based on the type, composition, and physical properties of slag 128 formed in gasifier 16. Sensor 30 may have a length Ls that is longer, shorter, and/or substantially the same as length L. Although sensor 30 is shown as extending through shell 104, sensor 30 may or may not extend through shell 104.

In the exemplary embodiment, sensor port 100 has an axial cross-sectional shape that is substantially square. More specifically, the square shape of sensor port 100 is oriented such that a corner of the square forms top ridge 116. In an alternative embodiment, sensor port 100 has any axial cross-sectional shape that forms top ridge 116 and width Ws and that enables sensor port 100 to function as described herein. For example, sensor port 100 may have an axial cross-sectional shape that is a triangle, a tear-drop, a parallelogram, a diamond, a polygon, and/or a shape selected based on a type of sensor positioned within sensor port 100. Further, although sensor port 100 is shown in FIG. 2 as being formed from a single refractory brick 126, sensor port 100 may be formed from any suitable number and/or configuration of refractory brick(s) 126. In the exemplary embodiment, sensor port 100 also has a radial cross-sectional shape defined by outer wall 114. Possible radial cross-sectional shapes of sensor ports are shown in FIGS. 3-6 and described in more detail below.

Referring again to FIGS. 2 and 3, in the exemplary embodiment, outer wall 114 and inner wall 118 define the same cross-sectional shapes. Alternatively, outer wall 114 and inner wall 118 may define different cross-sectional shapes. For example, outer wall 114 may define a square axial cross-sectional shape, and inner wall 118 may define a circular axial cross-sectional shape. In the exemplary embodiment, opening 120 receives at least one sensor 30 therein. More specifically, sensor port 100 has at least one sensor 30 positioned therein such that sensor 30 can directly measure a quantity, such as temperature, within gasifier 16. Sensor 30 is positionable adjacent to an inner end 130 of opening 120, within a center portion 132 of opening 120, and/or adjacent to an outer end 134 of opening 120. Further, a centerline 136 of opening 120 is substantially perpendicular to longitudinal axis 108. Alternatively, opening 120 oriented obliquely relative to longitudinal axis 108. For example, opening centerline 136 may be aligned downwardly to facilitate reducing slag penetration into sensor port 100.

Referring to FIG. 3, wall 102 is formed from a plurality of refractory bricks 124 within gasifier shell 104. Wall 102 defines a main flow path 138 through gasifier 16. Although only one layer of wall bricks 124 is shown, it should be understood that wall 102 may include any number of layers of wall bricks 124 extending between main flow path 138 and shell 104. In the exemplary embodiment, sensor port 100 is formed from refractory bricks 126 that are mortared, or otherwise coupled, to wall bricks 124. Port bricks 126 may be a standard brick configuration and/or a specially-designed brick configuration. Moreover, sensor port 100 may include any number or configuration of refractory port bricks 126 that form the radial cross-sectional shapes shown in FIGS. 3-6, for example. It should be understood that the radial cross-sectional shapes are exemplary only and sensor port 100 may have any suitable radial cross-sectional shape that enable sensor port 100 to function as described herein. It should further be understood that wall 102 and/or gasifier 16 includes any suitable number of sensor ports 100 defined therein.

In the exemplary embodiment shown in FIG. 3, sensor port 100 has a substantially rectangular radial cross-sectional shape formed by refractory port bricks 126. More specifically, sides 140, 142, 144, and 146 of outer wall 114 of sensor port 100 are substantially perpendicular to inner surface 106 of wall 102. In an alternative embodiment, top sides 140 and 142 of outer wall 114 are substantially perpendicular to inner surface 106 and bottom sides 144 and/or 146 are at any suitable orientation to inner surface 106.

To form wall 102 and sensor port 100, in the exemplary embodiment, a plurality of wall bricks 124 are coupled together to form wall 102. In the exemplary embodiment, wall bricks 124 are mortared together to define inner surface 106 of wall 102. At least one port brick 126 is coupled to wall bricks 124 to form sensor port 100 with opening 120 extending through wall 102. Port brick 126 is coupled to wall bricks 124 such that port end wall 122 is positioned distance L radially inward from inner surface 106. Further, port brick 126 forms top ridge 116 of sensor port 100 when coupled to wall bricks 124.

Figure 4:
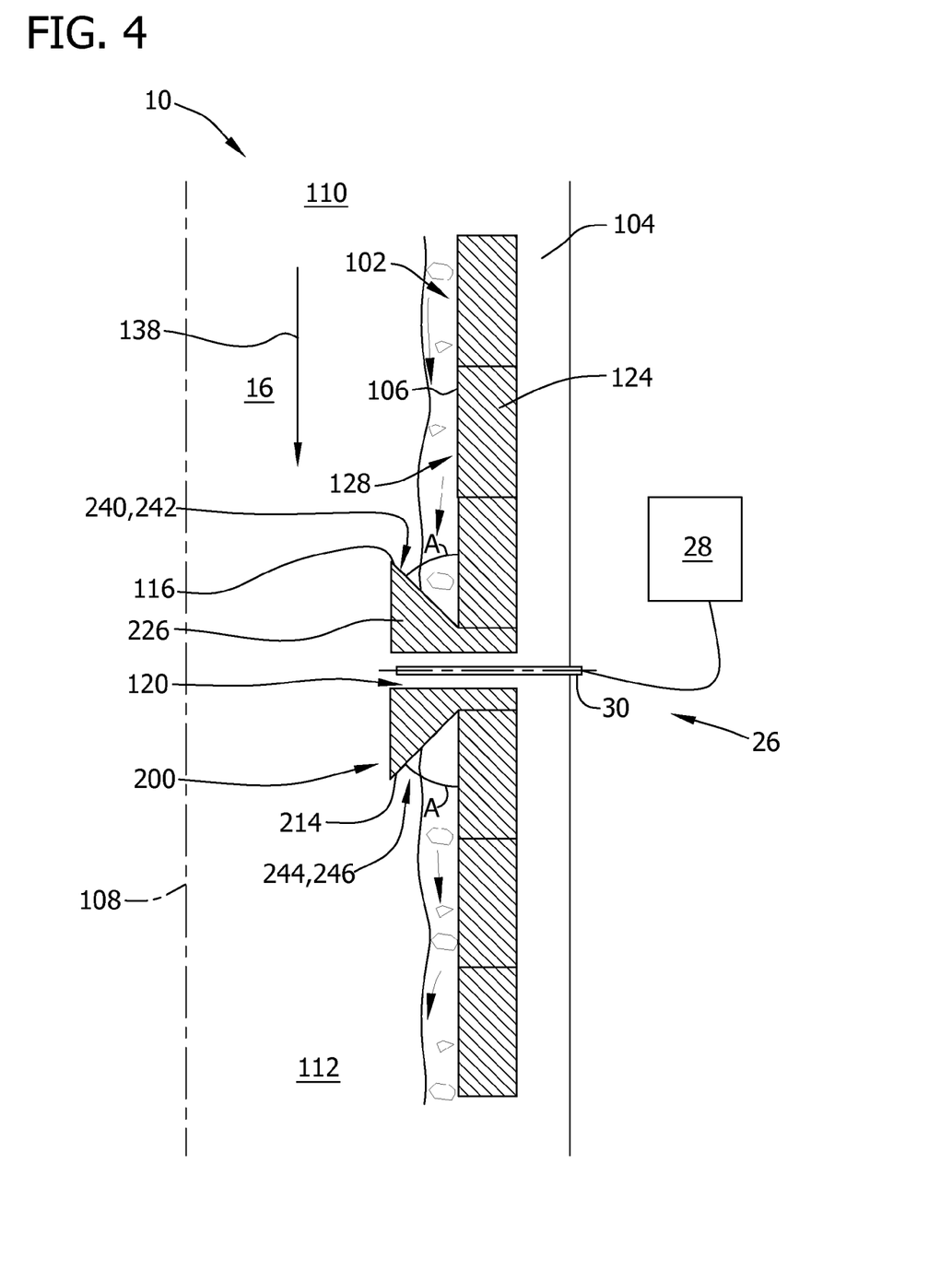
FIG. 4 is a partial cross-sectional side view of a first alternative sensor port that may be used with the system shown in FIG. 1.
Figure 5:
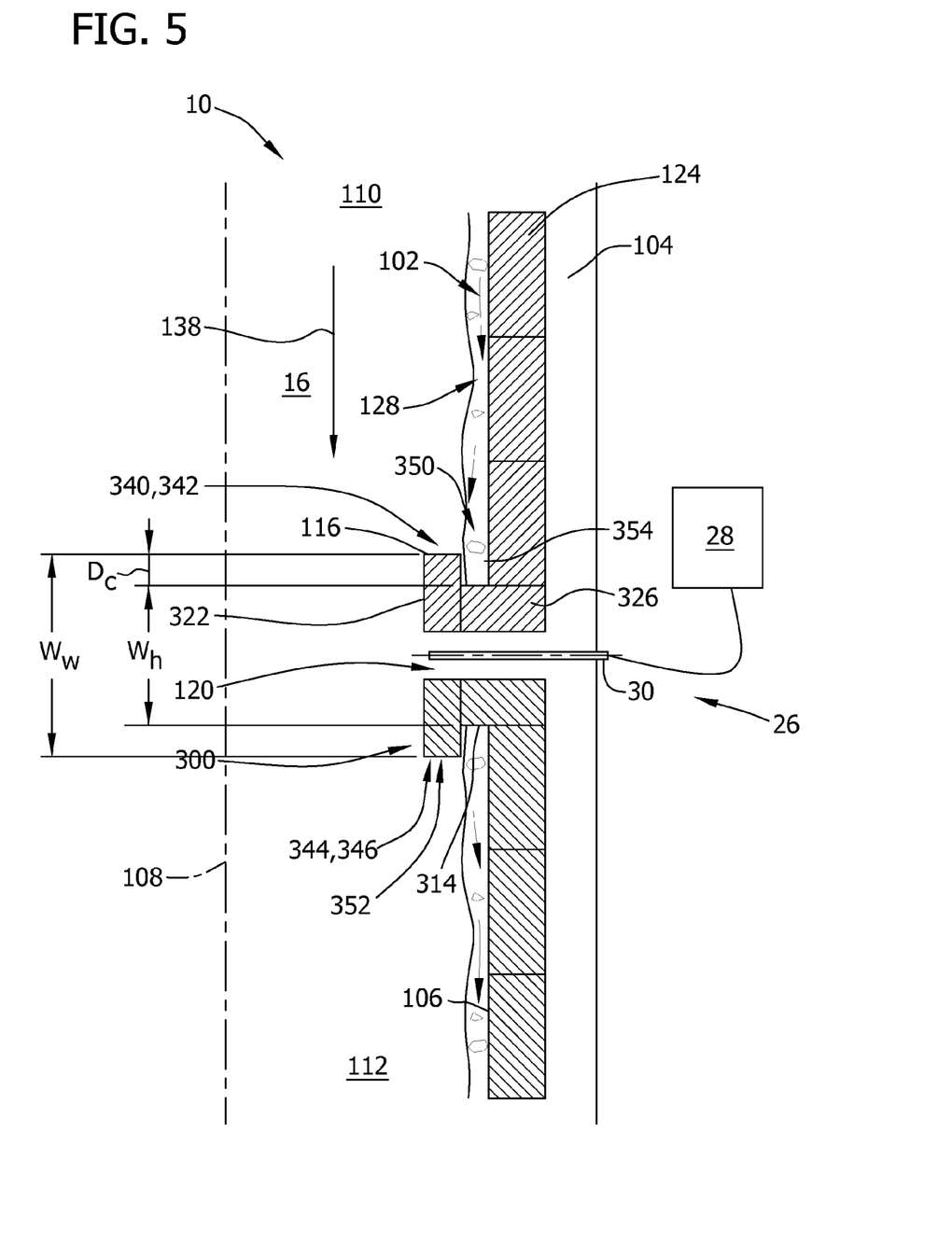
FIG. 5 is a partial cross-sectional side view of a second alternative sensor port that may be used with the system shown in FIG. 1.
Figure 6:
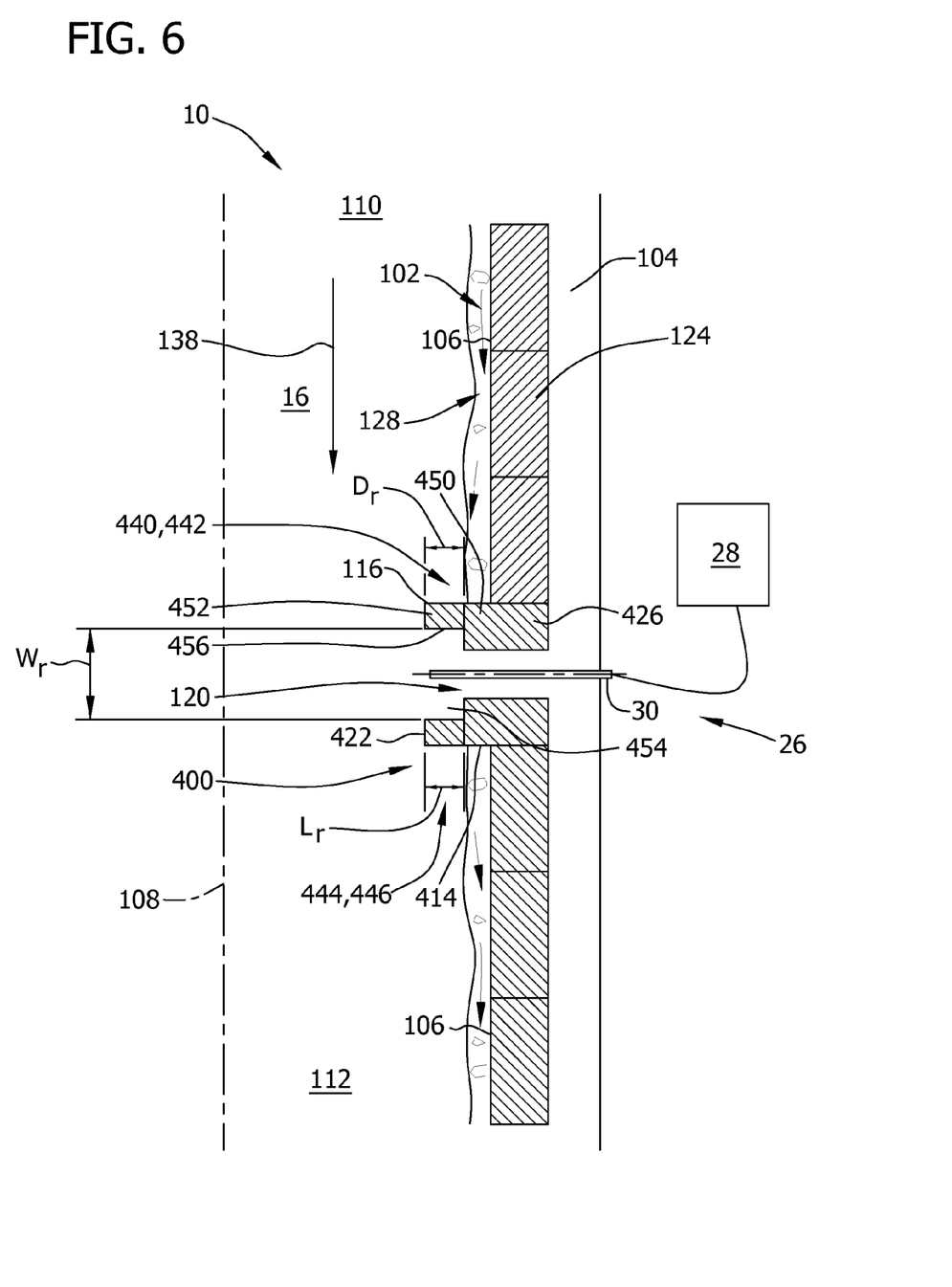
FIG. 6 is a partial cross-sectional side view of a third alternative sensor port that may be used with the system shown in FIG. 1.
Figure 7:
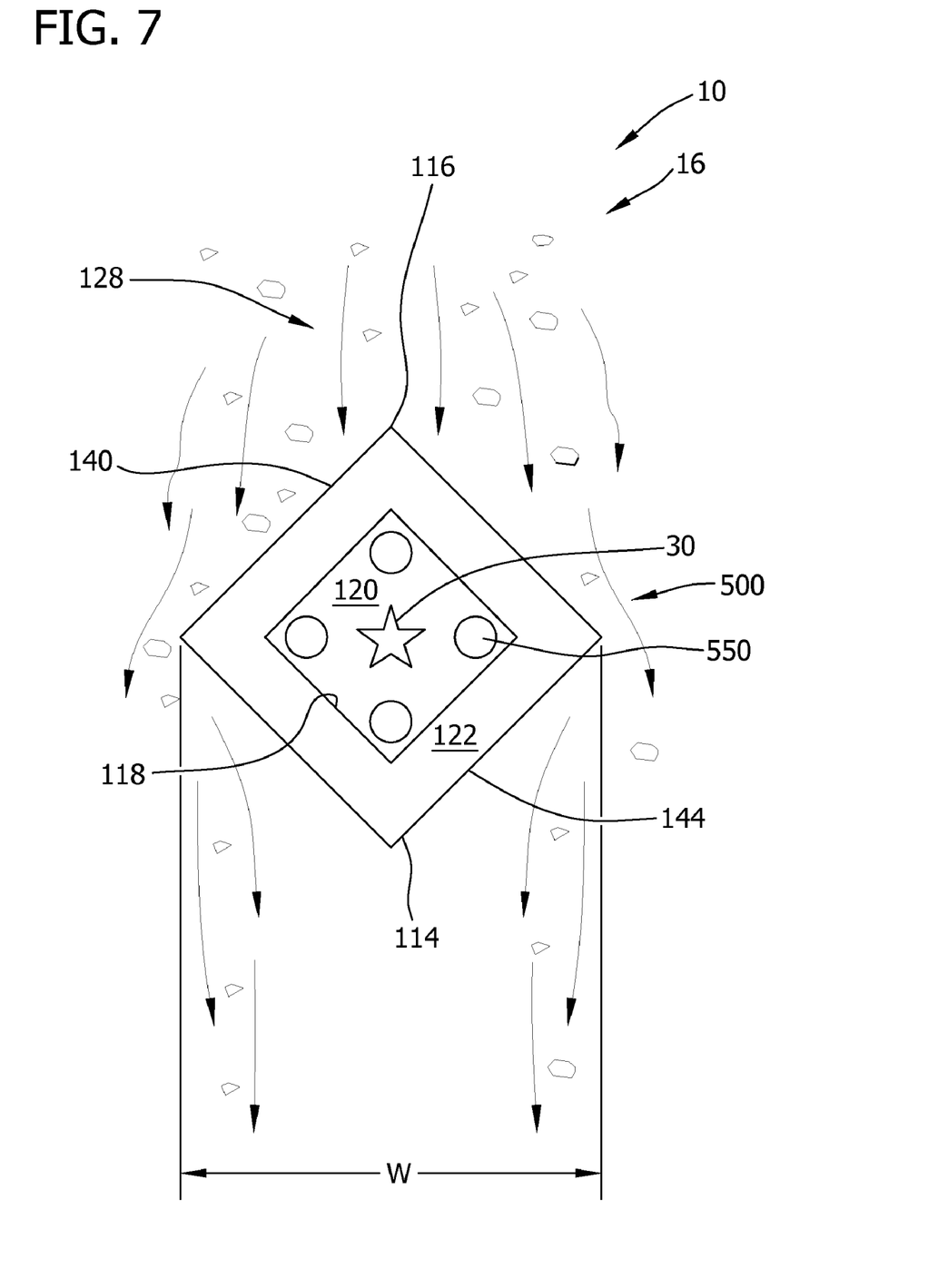
FIG. 7 is a schematic front view of a fourth alternative sensor port that may be used with the system shown in FIG. 1.

As shown in FIG. 3, port brick 126 is coupled to wall bricks 124 to define the substantially rectangular radial cross-sectional shape of sensor port 100. As shown in FIG. 4, port brick 226 is coupled to wall bricks 124 to define a substantially tapered radial cross-sectional shape of a sensor port 200. As shown in FIG. 5, port brick 326 is coupled to wall bricks 124 to define a stepped radial cross-sectional shape of a sensor port 300. As shown in FIG. 6, port brick 426 is coupled to wall bricks 124 to define a recessed radial cross-sectional shape of a sensor port 400. In one embodiment, as shown in FIG. 7, a cooling passage 550 is defined through opening 120. Referring again to FIGS. 2 and 3, at least one sensor 30 is positioned within sensor port 100 by inserting sensor 30 into opening 120.

During operation of IGCC system 10, as syngas is formed from at least fuel and $O_2$, solid particulates are formed as a by-product. As the solid particulates begin to cool, the solid particulates accumulate at least on wall inner surface 106 to form slag 128. Slag 128 flows downwardly along inner surface 106 and is collected at a bottom of gasifier 16. As slag 128 flows downward, sensor port 100 divides slag flow 128 to flow around outer wall 114. More specifically, top ridge 116 disrupts slag flow 128 and re-routes slag flow 128 around port outer wall 114. Sensor port 100 is oriented such that slag 128 does not flow across port end wall 122, and as such, slag 128 does not contact sensor 30 and/or form a slag curtain across opening inner end 130. Accordingly, sensor 30 measures quantities within gasifier 16 without slag 128 effecting the measurements.

FIG. 4 is a partial cross-sectional side view of a first alternative sensor port 200 that may be used with IGCC system 10 (shown in FIG. 1). Sensor port 200 is substantially similar to sensor port 100 (shown in FIGS. 2 and 3) except that sensor port 200 has a "tapered" radial cross-sectional shape rather than a "rectangular" cross-sectional shape as shown in FIG. 3. As such, similar components are labeled with similar references.

In the exemplary embodiment, sensor port 200 has a substantially tapered radial cross-sectional shape formed by at least one refractory brick 226. More specifically, sides 240, 242, 244, and 246 of outer wall 214 of sensor port 200 are oriented at an acute angle A relative to inner surface 106 of wall 102. In an alternative embodiment, top sides 240 and 242 of outer wall 214 are oriented at angle A relative to inner surface 106 and bottom sides 244 and/or 246 are at any suitable orientation to inner surface 106.

FIG. 5 is a partial cross-sectional side view of a second alternative sensor port 300 that may be used with IGCC system 10 (shown in FIG. 1). Sensor port 300 is substantially similar to sensor port 100 (shown in FIGS. 2 and 3) except that sensor port 300 has a "stepped" radial cross-sectional shape rather than the rectangular cross-sectional shape as shown in FIG. 3. As such, similar components are labeled with similar references.

In the exemplary embodiment, sensor port 300 has a stepped radial cross-sectional shape formed by at least one refractory brick 326. More specifically, sides 340, 342, 344, and 346 of outer wall 314 each include a narrow portion 350 formed adjacent to wall inner surface 106 and a wide portion 352 extending from narrow portion 350 to end wall 322. As such, a channel 354 is formed between inner surface 106 and wide portion 352 at narrow portion 350. Channel 354 has a depth Dc that is a difference between the width Wn of narrow portion 350 and width Ww of wide portion 352. Depth Dc may be any suitable depth that enables sensor port 300 to function as described herein. In an alternative embodiment, top sides 340 and 342 of outer wall 314 include channel 354 and bottom sides 344 and/or 346 do not include channel 354 and/or include a channel of a different depth.

FIG. 6 is a partial cross-sectional side view of a third alternative sensor port 400 that may be used with IGCC system 10 (shown in FIG. 1). Sensor port 400 is substantially similar to sensor port 100 (shown in FIGS. 2 and 3) except that sensor port 400 has a "recessed" radial cross-sectional shape rather than the rectangular cross-sectional shape as shown in FIG. 3. As such, similar components are labeled with similar references.

In the exemplary embodiment, sensor port 400 has a substantially rectangular outer radial cross-sectional shape with a recessed radial cross-section therein. Sensor port 400 is formed by at least one refractory brick 426. More specifically, sides 440, 442, 444, and 446 of outer wall 414 each include a thick portion 450 formed adjacent to wall inner surface 106 and a recess portion 452 extending from thick portion 450 to end wall 422. As such, a recess 454 is formed between end wall 422 and thick portion 450 at recess portion 452. Recess 454 has a depth Dr that is substantially equal to a length Lr of recess portion 452. Recess 454 has a width Wr that is defined by an inner wall 456 of recess portion 452. Depth Dr and/or width Wr have any suitable dimensions that enable sensor port to function as described herein. In an alternative embodiment, port outer wall 414 has other than rectangular outer radial cross-sectional shape. For example, outer wall 414 may define a tapered outer radial cross-sectional shape as shown in FIG. 4 and/or a stepped outer radial cross-sectional shape as shown in FIG. 5.

Figure 8:
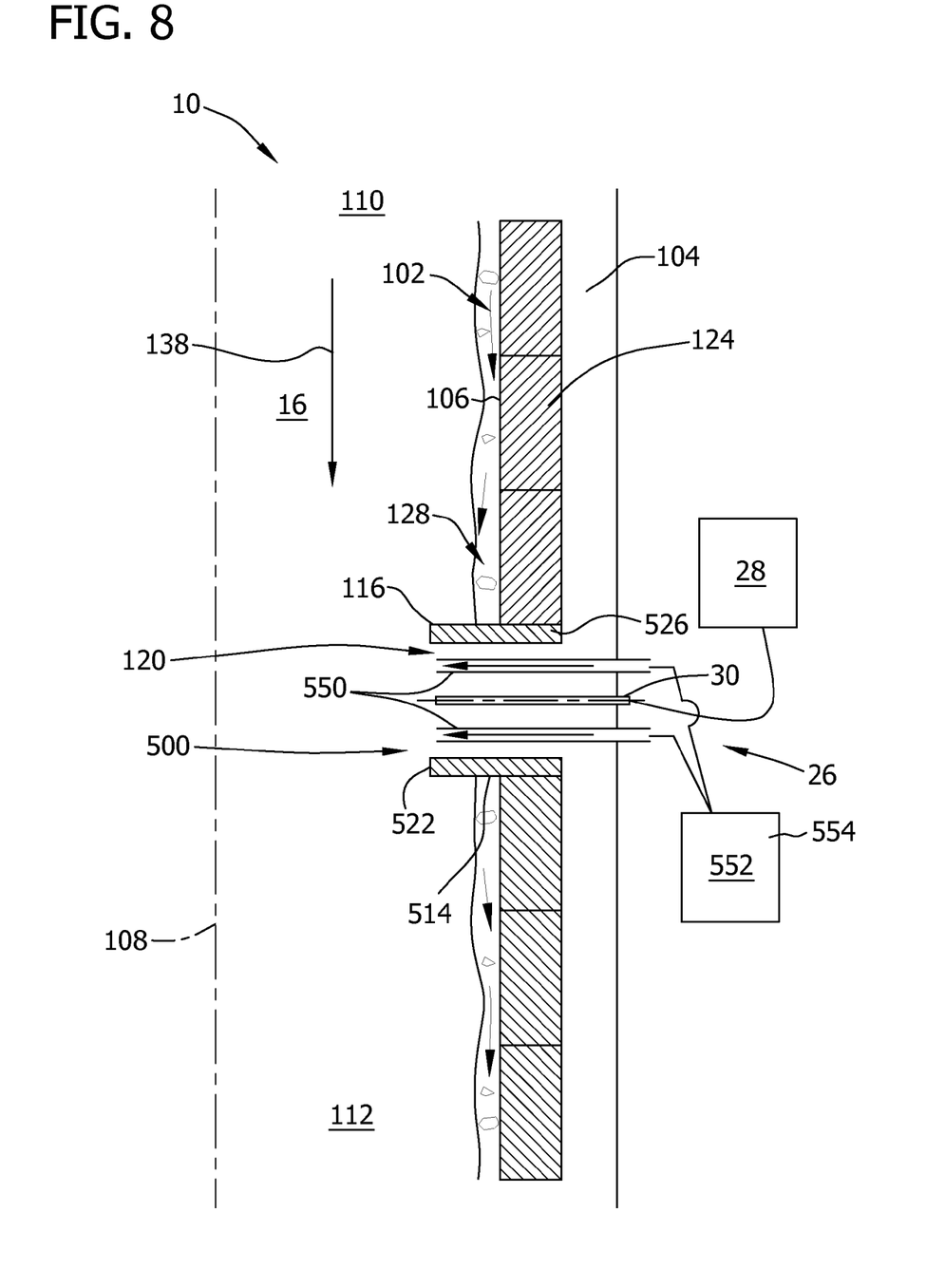
FIG. 8 is a partial cross-sectional side view of the sensor port shown in FIG. 7.

FIG. 7 is a schematic front view of a fourth alternative sensor port 500 that may be used with IGCC system 10 (shown in FIG. 1). FIG. 8 is a partial cross-sectional side view of sensor port 500. Sensor port 500 is substantially similar to sensor port 100 (shown in FIGS. 2 and 3) except that sensor port 500 includes at least one cooling passage 550 defined therethrough. As such, similar components are labeled with similar references.

In the exemplary embodiment, sensor port 500 has a substantially rectangular outer radial cross-sectional shape. In an alternative embodiment, port outer wall 514 has a non-rectangular outer radial cross-sectional shape. For example, outer wall 514 may define a tapered outer radial cross-sectional shape as shown in FIG. 4, a stepped outer radial cross-sectional shape as shown in FIG. 5, and/or recessed outer radial cross-sectional shape as shown in FIG. 6. In the exemplary embodiment, sensor port 500 is formed by at least one refractory brick 526 and includes at least one cooling passage 550 extending therethrough. Cooling passage 550 may be defined through port bricks 526 forming sensor port 500 and/or may be a duct positioned within opening 120 of sensor port 500. In the exemplary embodiment, a configuration of cooling passage 550 is selected based on a type of sensor positioned within sensor port 500. A coolant 554 is channeled into and/or through cooling passage 550 is, but is not limited to being, nitrogen, steam, water, and/or any other suitable inert gas. Coolant 554 can be purges directly into gasifier 16 and/or can be used for active cooling such that coolant 554 does not enter gasifier 16. In a particular embodiment, cooling passage 550 is formed from and/or includes a ceramic-type material that provides acceptable protection to sensor 30 within sensor port 500. Additionally, or alternatively, sensor 30 includes therein a cooling system that is designed based on sensor port 500.

In the exemplary embodiment, IGCC system 10 includes, or is coupled to, a coolant source 552. Coolant source 552 stores coolant 554 therein. In the exemplary embodiment, coolant 554 is water and coolant source 552 is a reservoir within IGCC system 10. Alternatively, coolant source 552 is any suitable component within IGCC system 10. Further, coolant 554 may be any suitable coolant that enables IGCC system 10 to function as described herein. In the exemplary embodiment, coolant source 552 is in flow communication with cooling passage 550 and is configured to channel coolant 554 into cooling passage 550.

Cooling passage 550 facilitates cooling sensor 30 within opening 120. As such, cooling passage 550 is typically not used when sensor 30 is a temperature sensor. In the exemplary embodiment, cooling passage 550 does not extend to end wall 522 but rather, cooling passage 550 discharges coolant into opening 120 to facilitate cooling at least a portion of sensor 30. Although FIG. 7 shows four cooling passages 550, sensor port 500 may include any suitable number and/or configuration of cooling passages 550 that enables IGCC system 10 to function as described herein.

The above-described embodiments provide a unique configuration and/or geometry of refractory bricks that facilitate protecting a sensor within a gasifier. More specifically, the refractory bricks defining a sensor port protrude from a hot inner surface of a refractory wall to a depth that is greater than a thickness of a flowing slag layer on the inner surface. Cross-sectional shapes of the sensor port are selected to ensure that a flowing slag stream is split around the sensor port. Thus, the sensor ports described herein enable a sensor to be inserted into a gasifier and acquire measurements within the gasifier without slag interference. Further, the sensor ports described herein extend a portion of the refractory wall into a gasifier process stream. Such an extension is designed to channel the slag flow around, but not over, the sensor port. As such, a sensor within the sensor port is able to detect and measure quantities of physical properties, such as temperature and pressure, of a gasifier internal process stream, accurately and directly without influence of the slag layer. By acquiring more accurate measurements of physical properties within the gasifier, as compared to known gasifiers that do not include the sensor ports described herein, the above-described embodiments facilitate enhanced control of the gasifier to better control of syngas production and related plant operability.

Moreover, the above-described sensor ports include an opening that may be oriented downwardly to facilitate reducing slag penetration into the refractory lining via the sensor port and to facilitate extending a sensor's useful life. Additionally, the sensor ports described herein are incorporated into the refractory design and vessel design of the gasifier. More specifically, the sensor ports are formed from the same refractory material as the refractory wall and, thus, the sensor ports form a portion of the refractory wall. Further, any one or combination of the above-described sensors ports may be defined in refractory wall depending on the instruments to be positioned within the gasifier and/or on the type, consistence, and/or composition of slag and/or other material produced in the gasifier.

Exemplary embodiments of a refractory wall and method for forming the same are described above in detail. The refractory wall and methods are not limited to the specific embodiments described herein, but rather, components of the wall and/or steps of the methods may be utilized independently and separately from other components and/or steps described herein. For example, the sensor port may also be used in combination with other measuring systems, and is not limited to practice with only the gasifier systems and methods as described herein. Rather, the exemplary embodiment can be implemented and utilized in connection with many other measurement applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of fabricating a vessel refractory wall, said method comprising:
   coupling a plurality of wall bricks together to form a wall, wherein the plurality of wall bricks defining an inner surface of the wall; and
   coupling at least one port brick to the plurality of wall bricks to form a sensor port that has an opening that extends through the wall, wherein at least a portion of the at least one port brick is positioned a distance radially inward from the inner surface of the wall, wherein the at least one port brick forms a top ridge of the sensor port, and wherein at least one cooling passage extends through the opening of the sensor port.

2. A method in accordance with claim 1, wherein coupling at least one port brick to the plurality of wall bricks further comprises coupling the at least one port brick to the plurality of wall bricks to define a substantially rectangular radial cross-sectional shape for the sensor port.

3. A method in accordance with claim 1, wherein coupling at least one port brick to the plurality of wall bricks further comprises coupling the at least one port brick to the plurality of wall bricks to define a substantially tapered radial cross-sectional shape for the sensor port.

4. A method in accordance with claim 1, wherein coupling at least one port brick to the plurality of wall bricks further comprises coupling the at least one port, brick to the plurality of wall bricks to define a stepped radial cross-sectional shape for the sensor port.

5. A method in accordance with claim 1, wherein coupling at least one port brick to the plurality of wall bricks further comprises coupling the at least one port brick to the plurality of wall bricks to define a recessed rectangular radial cross-sectional shape for the sensor port.

6. A method in accordance with claim 1 further comprising inserting a sensor into the opening of the sensor port.

7. A refractory wall comprising:
   a plurality of wall bricks coupled together to define an inner surface of said refractory wall; and
   a sensor port formed from at least one port brick coupled to said plurality of wall bricks, said sensor port comprising:
      an outer wall defining a radial cross-sectional shape of said sensor port and defining a top ridge of said sensor port;
      an inner wall defining an opening extending through said sensor port;
      an end wall extending between said outer wall and said inner wall, said end wall positioned radially inward a distance from said inner surface; and
      at least one cooling passage coupled in flow communication with a coolant source.

8. A refractory wall in accordance with claim 7 wherein said at least one port brick is mortared to at least one wall brick.

9. A refractory wall in accordance with claim 7 wherein said outer wall is oriented substantially perpendicularly to said inner surface.

10. A refractory wall in accordance with claim 7 wherein said outer wall is oriented at an acute angle with respect to said inner surface.

11. A refractory wall in accordance with claim 7 wherein said outer wall defines a channel adjacent to said inner surface.

12. A refractory wall in accordance with claim 7 wherein said end wall comprises a recess defined therein.

13. A refractory wall in accordance with claim 7 further comprising at least one sensor inserted within said opening of said sensor port.

14. A vessel comprising:
   a shell;
   a refractory wall coupled within said shell, said refractory wall defining an inner surface of said vessel;
   a sensor port formed from at least one port brick coupled to said refractory wall, said sensor port comprising:

an outer wall defining a radial cross-sectional shape of said sensor port and defining a top ridge of said sensor port;

an inner wall defining an opening extending through said sensor port; and an end wall extending between said outer wall and said inner wall, said end wall positioned radially inward a distance from said inner surface; and a coolant source coupled in flow communication with said sensor port for supplying a coolant to said sensor port.

15. A vessel in accordance with claim 14 wherein said outer wall defines at least one of a rectangular radial cross-sectional shape of said sensor port, a tapered radial cross-sectional shape of said sensor port, a stepped radial cross-sectional shape of said sensor port, and a recessed radial cross-sectional shape of said sensor port.

16. A vessel in accordance with claim 14 further comprising a sensor system comprising at least one sensor coupled to a control and acquisition system, said at least one sensor inserted within said opening of said sensor port.

17. A vessel in accordance with claim 14 wherein said outer wall defines one of a square axial cross-sectional shape of said sensor port, a polygonal axial cross-sectional shape of said sensor port, and a tear-drop axial cross-sectional shape of said sensor port.

\* \* \* \* \*